United States Patent
Foster

(10) Patent No.: US 7,179,775 B2
(45) Date of Patent: Feb. 20, 2007

(54) COATING REMOVAL COMPOSITIONS

(75) Inventor: Kathryn E. Foster, Sterling Heights, MI (US)

(73) Assignee: Henkel Kommanditgesellschaft Auf Aktien, Duesseldorf (DE)

(*) Notice: Subject to any disclaimer, the term of this patent is extended or adjusted under 35 U.S.C. 154(b) by 0 days.

(21) Appl. No.: 10/660,030

(22) Filed: Sep. 11, 2003

(65) Prior Publication Data

US 2004/0127375 A1 Jul. 1, 2004

Related U.S. Application Data

(60) Provisional application No. 60/409,811, filed on Sep. 11, 2002.

(51) Int. Cl.
  *C11D 1/70* (2006.01)
  *C11D 1/72* (2006.01)
  *C11D 3/08* (2006.01)
  *C11D 3/30* (2006.01)

(52) U.S. Cl. .............. 510/203; 510/201; 510/202; 510/206; 510/207; 510/212; 510/421; 510/435; 510/439; 510/499; 510/506; 510/509

(58) Field of Classification Search ......... 510/201, 510/202, 203, 206, 207, 212, 421, 435, 499, 510/506, 509
See application file for complete search history.

(56) References Cited

U.S. PATENT DOCUMENTS

| | | | |
|---|---|---|---|
| 2,710,843 A | 6/1955 | Stebleton | |
| 2,929,789 A | 3/1960 | Pickett et al. | |
| 2,951,043 A | 8/1960 | Blank | |
| 2,971,919 A | 2/1961 | Goldsmith | |
| 3,048,547 A | 8/1962 | Vosbigian | |
| 3,553,144 A | 1/1971 | Murphy | |
| 3,615,827 A | 10/1971 | Murphy | |
| 3,681,250 A | 8/1972 | Murphy | |
| 3,847,839 A | 11/1974 | Murphy et al. | |
| 4,090,001 A | 5/1978 | Mertzweiller nee Malliard et al. | |
| 4,233,174 A * | 11/1980 | Sheridan | 134/22.19 |
| 4,294,617 A | 10/1981 | Schlicklin et al. | |
| 4,414,128 A * | 11/1983 | Goffinet | 510/405 |
| 4,537,705 A | 8/1985 | Mahoney et al. | |
| 4,619,706 A | 10/1986 | Squires et al. | |
| 4,673,524 A | 6/1987 | Dean | |
| 4,770,713 A | 9/1988 | Ward | |
| 4,978,469 A * | 12/1990 | Seaman, Jr. | 134/22.17 |
| 5,006,279 A | 4/1991 | Grobbel et al. | |
| 5,391,234 A | 2/1995 | Murphy | |
| 5,411,678 A | 5/1995 | Sim | |
| 5,454,985 A | 10/1995 | Harbin | |
| 5,536,539 A | 7/1996 | Harbin | |
| 5,538,662 A * | 7/1996 | Klier et al. | 510/284 |
| 5,591,702 A | 1/1997 | Murphy | |
| 5,632,822 A | 5/1997 | Knipe, Jr. et al. | |
| 5,679,629 A * | 10/1997 | Kubota et al. | 510/197 |
| 5,701,922 A | 12/1997 | Knipe, Jr. et al. | |
| 5,721,204 A | 2/1998 | Maxwell et al. | |
| 5,759,975 A | 6/1998 | Maxwell | |
| 5,854,190 A | 12/1998 | Knipe, Jr. et al. | |
| 5,954,891 A | 9/1999 | Kondoh et al. | |
| 5,972,865 A | 10/1999 | Knipe, Jr. et al. | |
| 5,990,062 A | 11/1999 | Summerfield et al. | |
| 6,001,793 A * | 12/1999 | Figdore et al. | 510/243 |
| 6,200,940 B1 | 3/2001 | Vitomir | |
| 6,303,552 B1 | 10/2001 | Vitomir | |
| 2002/0144718 A1 | 10/2002 | Wilson | |
| 2004/0002437 A1* | 1/2004 | Wilson | 510/407 |

FOREIGN PATENT DOCUMENTS

| | | |
|---|---|---|
| WO | WO 99/06506 | 2/1999 |
| WO | WO01/00765 * | 1/2001 |
| WO | WO 02/053802 A1 | 7/2002 |

* cited by examiner

*Primary Examiner*—Gregory R. Del Cotto
(74) *Attorney, Agent, or Firm*—Stephen D. Harper; Mary K. Cameron

(57) ABSTRACT

An aqueous coating removal composition containing: a) an alkoxylated aromatic alcohol, b) an amine; and c) an inorganic base is provided. The coating removal compositions are useful in cleaning coatings such as paint from substrate surfaces and may be formulated to be essentially free (or, preferably, entirely free) of organic solvents classified as volatile organic compounds or HAPS.

17 Claims, No Drawings

COATING REMOVAL COMPOSITIONS

CROSS-REFERENCE TO RELATED APPLICATIONS

This application claims priority from provisional application Ser. No. 60/409,811, filed Sep. 11, 2002, incorporated herein by reference in its entirety.

FIELD OF THE INVENTION

This invention relates to compositions used to remove paint, particularly dried and/or aged paint and other coatings from substrate surfaces.

BACKGROUND OF THE INVENTION

This invention relates to cleaning dried, and/or aged paint, from surfaces where such paint is not desired. More particularly, this invention relates to cleaning paint from parts having one or more dried or cured layers of paint, to a novel water-based solution for accomplishing such cleaning, and to a concentrate from which the solution can be made by dilution with water only.

Current commercial practice in the art preponderantly utilizes solutions that comprise a component of amines and a component of organic solvent generally selected from the group consisting of simple alcohols and monoethers of glycols, most or all with molecules that contain no more than eight carbon atoms, in order to have sufficient water solubility. The amines used are typically alkanolamines like dimethyl ethanol amine, methyl isopropanol amine, and diethanol amine but are not limited to this class of amines. Typical solvents used in the solution are alcohols and glycol ethers, such as n-butanol, ethylene glycol mono butyl ether, diethylene glycol n-butyl ether, triethylene glycol methyl ether, propylene glycol normal butyl ether, dipropylene glycol methyl ether, propylene glycol methyl ether, and propylene glycol normal propyl ether. Typical concentrate formulas consist of 85 to 99% of solvent and 1 to 15% of alkanolamine, with the balance water. The concentrates are usually diluted to from 5% to 15%, by weight or volume, in deionized water for use as a working water-based paint-removing solution. Operating temperature when using the water-based solution is usually from 21 to 55.degree. C.

Although a large number of different types of compositions have been developed for the purpose of removing paint and other organic coatings from substrate surfaces, many of the paint stripper formulations in commercial use currently contain substantial quantities of relatively volatile organic solvents which are classified as "HAPS" (Hazardous Air Pollutants). In view of the recent increase in regulatory restrictions on the use of such substances, the development of coating removal compositions which are substantially or entirely HAPS-free is currently a subject of great interest. Unfortunately, however, many of the HAPS-free formulations developed to date are not as efficient in removing paint as the conventional solvent-based coating removal compositions. That is, the rate at which a coating is loosened from the substrate surface is often decreased significantly as the volatile organic solvent concentration is reduced. An object of the current invention is to provide a cleaner that is substantially or entirely HAPS-free which also provides adequate rates of coating removal even on completely dried and/or cured paint, and on aged paint. Other alternative and/or concurrent objects will become apparent from the description below.

Except in the claims and the operating examples, or where otherwise expressly indicated to the contrary, all numerical quantities in this description indicating amounts of material or conditions of reaction and/or use are to be understood as modified by the word "about" in describing the broadest scope of the invention. Practice within the numerical limits stated is generally preferred, however. Also, throughout the description and claims, unless expressly stated to the contrary: percent, "parts of", and ratio values are by weight; the term "polymer" includes "oligomer", "copolymer", "terpolymer", and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; specification of materials in ionic form implies the presence of sufficient counterions to produce electrical neutrality for the composition as a whole, and any counterions thus implicitly specified preferably are selected from among other constituents explicitly specified in ionic form, to the extent possible; otherwise such counterions may be freely selected, except for avoiding counterions that act adversely to the objects of the invention; the term "paint" and its grammatical variations includes any more specialized types of protective exterior coatings that are also known as, for example, lacquer, electropaint, shellac, top coat, base coat, color coat, and the like; and the term "mole" and its variations may be applied to ionic, chemically unstable neutral, or any other chemical species, whether actual or hypothetical, that is specified by the type(s) of atoms present and the number of each type of atom included in the unit defined, as well as to substances with well defined neutral molecules.

SUMMARY OF THE INVENTION

The invention is directed to an aqueous coating removal composition comprising: a) an alkoxylated aromatic alcohol such as ethoxylated benzyl alcohol, b) an amine such as an alkanolamine; and c) an inorganic base such as sodium silicate.

More particularly, the invention provides a coating removal composition wherein the concentration of the inorganic base is at least 10%, the alkoxylated aromatic alcohol component is present in an amount from 4–15%

It is desirable that the ratio of the alkoxylated aromatic alcohol component to the base component is less than 1:1.

The invention further provides a coating removal composition wherein the concentration of the amine component is at least 0.8 and is not more than 3.4%.

Another object of the invention is to provide a coating removal concentrate composition comprising two separately packaged parts to be combined and diluted with water prior to application on a substrate, wherein Part A comprises an alkoxylated aromatic alcohol; and an amine; and Part B comprises an inorganic base, and optionally, chelating agents, corrosion inhibitors, thickeners, surfactants, and mixtures thereof.

It is desirable in the two part concentrate that Part A comprises 75–90 wt % alkoxylated aromatic alcohol component and 10–25 wt % amine component and Part B comprises 41–44 wt % inorganic base component. It is a further object of the invention to provide a working coating removal composition comprising a mixture of the concentrate with water; desirably in this working composition the ratio of A:B is 1:3 to 1:2.25.

DETAILED DESCRIPTION OF THE INVENTION

The present invention is particularly suitable for use in removing cured water-borne paint as well as solvent-borne paint and the various embodiments described as preferred herein are preferred with respect to such end-use application.

The alkoxylated aromatic alcohols preferably are water-soluble or water-miscible and preferably are selected from alkoxylated aromatic alcohols containing one or more compounds each containing at least one aromatic ring per molecule and alkoxylate units of general formula I

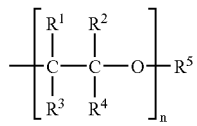

wherein: R1, R2, R3 and R4 are independently selected from hydrogen and methyl; R5 is hydrogen, a C1–C6 alkyl, or phenyl; and n is 2–10. The value of n is preferably selected to be sufficiently high so as to enable the resulting coating removal composition to be classified as HAPS-free. The alkoxylate units of formula I are attached to the aromatic ring directly or through an ether (oxygen) linkage or an oxymethylene (—CHR8O—) linkage, wherein R8 is hydrogen or C1–C4 alkyl.

The end alkoxylate unit is preferably end-capped (terminated) with a hydrogen atom. The aromatic ring can also contain one or more alkyl substituents of one to four carbons each. Examples of such alkyl substituents include methyl, ethyl, propyl, and isopropyl. It is generally preferred to avoid alkyl substituents longer than 4 carbon atoms, since the resulting alkoxylated aromatic alcohols typically are surfactants.

The use of alkoxylated aromatic alcohols permits the formulation of coating removal compositions having a low VOC (Volatile Organic Compound) content is preferred, as such alcohols are considerably less volatile than the aliphatic alcohols, glycol ethers, and other solvents typically used in such products but provide cleaning solutions that are very effective in removing paint from substrate surfaces. In one desirable embodiment of the present invention, the coating removal composition is essentially free, or, preferably, entirely free, of any organic solvent which is legally regulated as a VOC or HAP. Depending upon the VOC or HAPS requirements of a particular application, however, any of these conventionally used organic solvents may be blended together with the alkoxylated aromatic alcohol in order to provide coating removal compositions having a desired level of paint removal performance.

In one embodiment, the coating removal composition contains one or more compounds each containing at least one aromatic ring and alkoxylate units of general formula I

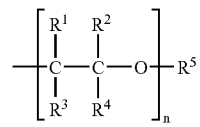

wherein: R1, R2, R3 and R4 are independently selected from hydrogen and methyl; R5 is hydrogen, a C1–C6 alkyl, or phenyl; and n is 2–10. The alkoxylate unit of formula I may be attached to the aromatic ring directly or through an ether (oxygen) linkage or an oxymethylene (—CHR8O—) linkage, wherein R8 is hydrogen or C1–C4 alkyl.

Another embodiment contains one or more alkoxylated aromatic alcohols of general formula II with a number average (Navg.) of alkoxylate units per molecule from about 2.5 to about 5, wherein R1, R2, R3, R4 and R5 are as defined in formula I, and R6, R7 and R8 are independently selected from hydrogen and C1–C4 alkyl (preferably, no more than one of R6–R8 is a substituent other than hydrogen). R5 preferably is hydrogen. Also, it is preferred that the substituents R1, R2, R3 and R4 combine to be at least 60 atom %, more preferably at least 80 atom %, hydrogen.

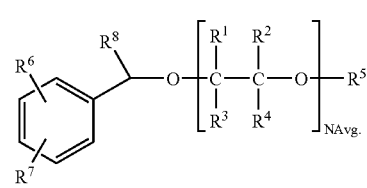

Another embodiment contains one or more alkoxylated compounds of general formula III with a number average (Navg.) of alkoxylate units from about 2.5 to about 5, wherein R1, R2, R3, R4 and R5 are as defined in formula I, and R6 and R7 are independently selected from hydrogen and C1–C4 alkyl. Also, it is preferred that the substituents R1, R2, R3 and R4 combine to be at least 60%, more preferably at least 80%, hydrogen atoms. Further, it is preferred that R6 and R7 are both hydrogen atoms. In addition, in preferred embodiments of the invention R⁵ is hydrogen.

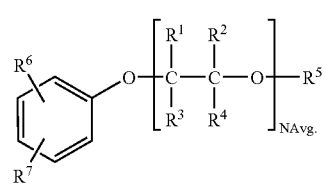

One type of alkoxylated aromatic alcohol that can be used is selected from the Genapol® family of solvents obtained from Clariant. For example, Genapol® BA-040 is a mixture of ethoxylated benzyl alcohols that contain from one to about 10 ethoxylate units. A small weight percentage of the alkoxylated aromatic alcohol can be compounds with more than 10 ethoxylate units. The number average (Navg.) of ethoxylate units is about four.

Another type of alkoxylated aromatic alcohol that can be used is selected from the Harcross® family of products sold by Harcross Chemicals, Inc. For example, Harcross® T Det P4 is a mixture of ethoxylated phenols that contain from one to about 10 ethoxylate units. A small weight percentage of the alkoxylated aromatic alcohol can be compounds with more than 10 ethoxylate units. The number average (Navg.) of ethoxylate units is about 3.3. The manufacturer reports that Harcross® T Det P4 includes the following distribution of degrees of ethoxylation where the number of ethoxylate units is indicated by n: 3.3% of n=1; 11.6% of n=2; 19.9% of n=3; 22.4% of n=4; 18.6% of n=5; 12.3% of n=6; 6.7% of n=7; 3.1% of n=8; and 1.26% of n=9.

Another type of alkoxylated aromatic alcohol that can be used is represented by the ST-8329 product sold by Clariant Corporation. Clariant's ST-8329 is a mixture of ethoxylated benzyl alcohols that contain from one to about 10 ethoxylate units per molecule with a Navg. of ethoxylate units of about four.

It is to be understood that coating removal compositions of the invention are not limited to the three types of commercially available alkoxylated aromatic alcohols noted above. These types are provided only as examples of alkoxylated aromatic alcohols that can be used in the coating removal compositions of the invention. Applicant emphasizes that suitable alkoxylated aromatic alcohols include the general class of compounds defined with an alkoxylate group of formula I attached to an aromatic organic moiety. In particular, the aromatic alkoxylated solvents that can be used in the coating removal compositions of the invention are most preferably of the class of compounds defined by formula II or formula III.

Specific illustrative types of alkoxylated aromatic alcohols that can be used in the present invention include triethylene glycol monophenyl ether, tetraethylene glycol monophenyl ether, pentaethylene glycol monophenyl ether, hexaethylene glycol monophenyl ether, heptaethylene glycol monophenyl ether, triethylene glycol monobenzyl ether, tetraethylene glycol monobenzyl ether, pentaethylene glycol monobenzyl ether, hexaethylene glycol monobenzyl ether, heptaethylene glycol monobenzyl ether, water-soluble ethoxylates of propylene glycol monophenyl ether (preferably, containing an average of at least 2 oxyethylene moieties per molecule), and the like and mixtures thereof.

The coating removal compositions of the present invention additionally contain one or more amines, which preferably are water-soluble or water-miscible. Alkanolamines are a preferred type of amine. The preferred alkanolamines are selected from ethanolamine, diethanolamine, triethanolamine, dimethylethanolamine, diisopropanolamine, isopropanolamine, methylisopropanolamine, n-butyldiethanolamine, 2-methylaminoethanol, n-butylaminoethanol, diethylaminoethanol, 2-amino-2-methyl-1-propanol, or phenyl diethanolamine. The most preferred alkanolamines are diisopropanolamine (DIPA), diglycolamine and monoisopropanolamine (MIPA). Amines which do not contain hydroxyl groups such as alkylamines (e.g., triethylamine) and oxazolidines can also be used.

One or more inorganic bases are also present in the coating removal composition. Examples of suitable inorganic bases include alkali metal and ammonia hydroxides, alkali metal carbonates, alkali metal silicates, alkali metal phosphates, and other basic alkali metal salts. Sodium silicate is a particularly preferred inorganic base. Mixtures of sodium silicate and potassium hydroxide have also been found to be especially effective.

Additional ingredients may also be present in the coating removal composition such as, for example, chelating agents, corrosion inhibitors, thickeners, surfactants, and any of the other additives conventionally used in paint stripping formulations.

It is generally preferred that the pH of the cleaning solution be from about 9 to about 14, more preferably from about 11 to about 14.

The concentrations of the individual ingredients of the coating removal compositions of the present invention may be varied as may be desired or needed depending upon the type of coating to be removed and the rate at which coating removal is to be effected. Optimal concentrations for a particular application may be readily determined by a worker skilled in the art using standard experimental methods.

The coating removal composition may be provided in a concentrate for dilution with water or as a working paint-removing solution. In one embodiment, a two part concentrate package is provided which typically comprises a Part A comprising 75–90 wt % alkoxylated aromatic alcohol component, 10–25 wt % amine component and a Part B comprising 41–44 wt % inorganic base component, the remainder of Part B comprising chelating agents, corrosion inhibitors, thickeners, surfactants, and water. A working paint-removing solution typically comprises Part A, Part B and water wherein the ratio of A:B is 1:3 to 1:2.25.

In a working paint-removing solution, the concentration of the alkoxylated aromatic alcohol component as described above preferably is at least, with increasing preference in the order given, 4, 5, 6, 7, 8, 8.5, 9, or 9.5% and independently preferably, at least for economy, is not more than, with increasing preference in the order given, 15, 14, 13, 12, 11, 10.5 or 10%. The concentration of the amine component as described above preferably is at least, with increasing preference in the order given, 0.8, 1.0, 1.3, 1.6, 1.9, 2.1, 2.3, or 2.5% and independently preferably, at least for economy, is not more than, with increasing preference in the order given, 3.4, 3.2, 3, 2.9, or 2.8%. The concentration of the inorganic base component preferably is at least, with increasing preference in the order given, 10, 11, 12, 13, 14, 15 16, 17, 18% and independently preferably, at least for economy, is not more than with increasing preference in the order given, 30, 28, 26, 24, 22, 20%. Preferably, the ratio of alkoxylated aromatic alcohol component to the base component is less than 1:1. Higher concentrations within these preferences are preferred for immersion or low force spraying, while lower concentrations are satisfactory technically and are more economical for high force spraying.

In general, however, preferred coating removal compositions may be formulated within the following parameters:

| Ingredient | Preferred, Wt % | More Preferred, Wt % |
|---|---|---|
| Water | 60–80 | 65–75 |
| Alkoxylated Aromatic Alcohol | 4–15 | 8–12 |
| Amine | 0.1–2.5 | 1.0–1.5 |
| Inorganic Base | 10–30 | 18–22 |

In one preferred embodiment of the invention, the coating removal composition is comprised of 55 to 85 weight % water, 12 to 22 weight % alkali metal silicate, 1 to 5 weight % alkali metal hydroxide, 0.1 to 1 weight % alkanolamine, and 5 to 15 weight % of one or more alkoxylated aromatic alcohols selected from the group consisting of ethyoxylated benzyl alcohols and ethoxylated phenols containing from 2 to 6 oxyethylene units per molecule.

In one embodiment of the invention, the coating removal composition is prepared shortly before use by combining two separately packaged components (hereinafter "Component A" and "Component B"). Component A contains the alkoxylated aromatic alcohol and amine, but little or none of the inorganic base or bases which will be present in the coating removal composition once Components A and B are combined. Preferably, Component A contains less than about 1% by weight inorganic base, more preferably less than about 0.3% by weight inorganic base. Expressed a different way, Component A preferably contains less than about 10% (more preferably, less than about 3%) by weight of the total amount of inorganic base present in the final coating removal composition. It is not necessary to include any inorganic base in Component A, as the alkoxylated aromatic alcohols generally have very good solvency. However, Component A can be used in isolation (without being combined with Component B) as a cleaning product for some applications where the high degree of alkalinity furnished by Component B is not needed. For this reason, a small amount of inorganic base (especially where the inorganic base is an alkali metal silicate) can be included in Component A to provide corrosion protection where the composition is to be used to clean aluminum substrate surfaces. Water may also be included in Component A if desired or needed for the purpose of providing a homogeneous solution.

Component A preferably has the following composition:

| Ingredient | Preferred, Wt % | More Preferred, Wt % |
|---|---|---|
| Alkoxylated Aromatic Alcohol | 20–80 | 40–65 |
| Amine | 0.5–35 | 1–5 |
| Inorganic Base | 0–3 | 0.01–1 |
| Water | 0–65 | 30–60 |

The paint purge product sold by the Surface Technologies division of Henkel Corporation (Madison Heights, Mich.) under the name PARCOSOL 277WB and the paint purge compositions described in WO 02/053802 (corresponding to U.S. Ser. No. 10/027,445, filed 20 Dec. 2001, incorporated herein by reference in its entirety) are also suitable for use as Component A.

Component B contains little or none of the alkoxylated aromatic alcohol and amine, but does contain an amount of one or more inorganic bases effective to provide the desired inorganic base concentration once combined with Component A (which contains at most only a minor portion of the total quantity of inorganic base in the coating removal composition). For convenience when mixing Components A and B, the inorganic base(s) of Component B are preferably dissolved in water to provide a homogeneous solution. The inorganic base concentration in Component B is preferably within the range of from about 10 to about 50 percent by weight.

One advantage of packaging the inorganic base component separately from the alkoxylated aromatic alcohol and amine is that the relative proportions of these ingredients in the formulated coating removal composition may be easily varied by the user as needed to suit a particular paint stripping task. For example, as the amount of Component B is increased relative to Component A, the time required to effect complete coating removal may be reduced for certain types of coatings. For other types of coatings, however, paint removal may be more rapid as the proportion of Component A as compared to Component B is increased.

Separate packaging of the two components also helps prevent phase separation of the coating removal composition. Although the preferred alkoxylated aromatic alcohols used in this invention are water-miscible, as the amount of inorganic base in the composition increases, the solubility of the alkoxylated aromatic alcohols generally decreases. Phase separation does not affect the performance of the coating removal composition, but does require that the components be packaged separately to facilitate efficient mixing and addition of the ingredients in the bath or tank in the desired proportions.

Paint (or other organic coating) can be removed from a paint covered surface by contacting the surface with a coating removal composition of the invention. Although the methods of contacting the surface with the coating removal composition can be accomplished in a number of ways, immersion and spraying are the most preferred methods. If the surface to be cleaned is readily accessible, then spraying is generally preferred. The mechanical force of the impinging coating removal composition facilitates removal of the paint. On the other hand, if the surface to be cleaned has recesses or other shapes that are not readily accessible, immersion will generally be preferred. Of course, both methods can be used in combination and/or varied in ways apparent to those skilled in the art. The optimal component concentrations and temperature of the coating removal composition depend on the method of contact and the type of coating to be removed, among other factors. It is to be understood however, that those skilled in the art can determine optimal conditions for particular coating removal applications by minimal experimentation.

The contact time needed to effect a substantial removal of paint from a surface will depend on the nature and thickness of the paint, the composition of the coating removal composition including the ingredient concentrations, the temperature of the composition, and other factors. With some paints and under some conditions, contact times of a few minutes (e.g., 2–3 minutes) may be sufficient.

If the coating removal composition is sprayed onto a surface, the spraying pressure will usually range from 1.3 bars to 8.0 bars absolute pressure. The temperature of the coating removal composition will usually range from 15° C. to 90° C. Higher temperatures and pressures generally increase the rate at which the paint is removed from the surface. In one embodiment, the working temperature range is higher. In this embodiment, the temperature of the coating removal composition will usually range from 75° C. to 105° C. The temperature of the coating removal composition preferably is at least, with increasing preference in the order given, 25, 30, 35, 40, 45, 50, 55, 60, 63, 65, 67, 69, 71, 73, 75° C. and independently preferably, at least for economy, is not more than with increasing preference in the order given, 110, 108, 106, 103, 102, 101, or 100° C.

The invention and its benefits will be better understood with reference to the following examples. These examples are intended to illustrate specific embodiments within the overall scope of the invention as claimed, and are not to be understood as limiting the invention in any way.

EXAMPLES

Example 1

| Component A | |
|---|---|
| Deionized Water | 45.58 wt % |
| GENAPOL BA-040 | 52.33 wt % |
| Monoisopropanolamine | 1.96 wt % |
| Sodium Silicate (40%) | 0.13 wt % |
| Component B | |
| Tap Water | 37.78 wt % |
| Sodium Silicate (40%) | 52.52 wt % |
| Liquid Caustic Potash (45%) | 9.70 wt % |

A coating removal composition in accordance with the invention was prepared by mixing 1 part by volume Component A with 4 parts by volume Component B. The coating removal composition was poured into a spray cleaner tank and applied by spraying onto coated parts at a pressure of 25 to 30 psi. The tank was maintained at a temperature of 49 degrees C. The coating was successfully removed from the parts within 180 seconds under these conditions.

Example 2

The following formulation in accordance with the invention was also found to be particularly effective in removing an organic coating from a substrate surface:

| PARCOSOL 277WB | 20 vol. % |
|---|---|
| Sodium Silicate (40%) | 40 vol. % |
| Tap Water | 40 vol. % |

The coating removal composition was applied with no further dilution by spray using a standard air-assisted spray gun set at a pressure of 15 to 20 psi. The composition was maintained at a temperature of 25 degrees C. The coating was successfully removed from the coated parts within 180 seconds under these conditions.

Example 3

The following formulation in accordance with the invention was also found to be particularly effective in removing an organic coating from a substrate surface:

| Component A | |
|---|---|
| GENAPOL BA-040 | 85.5 wt. % |
| Diglycolamine | 14.5 wt. % |
| Component B | |
| Liq. Caustic Potash (45%) | 92 wt % |
| Gluconic Acid | 8 wt % |

A coating removal composition in accordance with the invention was prepared by mixing 10 volume % Component A, 30 volume % Component B, and 60 volume % water. The coating removal composition was poured into an immersion tank and coated parts were immersed in the composition until the coating was completely removed, which required between 20 and 60 minutes depending upon the type of coating being removed from the substrate. The tank was maintained at a temperature of 85 degrees C.

What is claimed is:

1. A coating removal concentrate composition comprising two separately packaged parts to be combined and diluted with water prior to application on a substrate, wherein
Part A comprises:
   a. 75–90 wt % of an alkoxylated aromatic alcohol; and
   b. 10–25 wt % of an alkanolamine; and
Part B comprises:
   a. an inorganic base, and
   b. optionally, chelating agents, corrosion inhibitors, thickeners, surfactants, and mixtures thereof.

2. The coating removal composition of claim 1 wherein the inorganic base is selected from the group consisting of alkali metal silicates, alkali metal hydroxides, and mixtures thereof.

3. The coating removal composition of claim 1 wherein the alkoxylated aromatic alcohol selected from the group consisting of ethoxylated unsubstituted benzyl alcohols, ethoxylated unsubstituted phenols, and mixtures thereof.

4. The coating removal composition of claim 1 wherein the alkoxylated aromatic alcohol contains at least one aromatic ring and alkoxylate units of general formula I

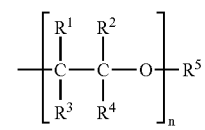

I wherein: $R^1$, $R^2$, $R^3$ and $R^4$ are independently selected from hydrogen and methyl; $R^5$ is hydrogen, a $C_1$–$C_6$ alkyl, or phenyl; and n is 2–10.

5. The coating removal composition of claim 1 comprising a mixture of alkoxylated aromatic alcohols of general formula II with a number average Navg. of alkoxylate units from about 2.5 to about 5:

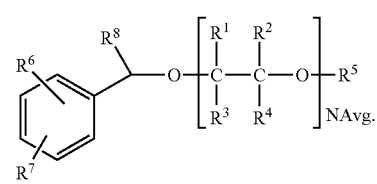

II

6. The coating removal composition of claim 1 comprising a mixture of alkoxylated aromatic alcohols of general formula III with a number average Navg. of alkoxylate units from about 2.5 to about 5:

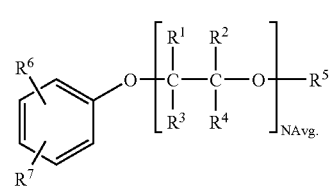

III

7. The coating removal concentrate composition of claim 1 wherein Part B comprises 41–44 wt % inorganic base component.

8. The coating removal concentrate composition of claim 7 wherein the alkanolamine component comprises diglycolamine and Part B comprises a chelating agent.

9. The coating removal concentrate composition of claim 8, wherein Part A comprises 85.5 wt % alkoxylated aromatic alcohol component and 14.5 wt % diglycolamine and the ratio of A:B is 1:3 to 1:2.25.

10. A coating removal composition comprising:
   a) water;
   b) an ethoxylated unsubstituted benzyl alcohol, and optionally ethoxylated unsubstituted phenols;
   c) an amine; and
   d) an inorganic base at a concentration of at least 10 wt % and not more than 30 wt %;
wherein the an ethoxylated unsubstituted benzyl alcohol and optionally ethoxylated unsubstituted phenols are present in an amount from 4–15 wt % and the ratio of the an ethoxylated unsubstituted benzyl alcohol, and optionally ethoxylated unsubstituted phenols to the base component is less than 1:1.

11. The coating removal composition of claim 10 wherein the inorganic base is selected from the group consisting of alkali metal silicates, alkali metal hydroxides, and mixtures thereof.

12. The coating removal composition of claim 10 wherein the amine is an alkanolamine.

13. The coating removal composition of claim 10 wherein the concentration of the amine component is at least 0.8 wt % and is not more than 3.4 wt %.

14. A coating removal composition comprising:
   a) water;
   b) an alkoxylated aromatic alcohol comprising:
      a mixture of alkoxylated aromatic alcohols of general formula II with a number average Navg. of alkoxylate units from about 2.5 to about 5:

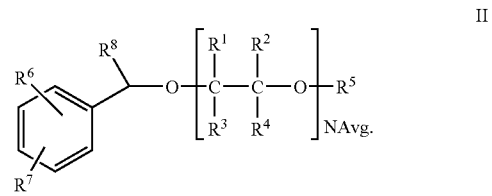

wherein $R^1$, $R^2$, $R^3$, and $R^4$ are independently selected from hydrogen and methyl; $R^5$ is hydrogen, a $C_1$–$C_6$ alkyl or phenyl; and $R^6$, $R^7$ and $R^8$ are independently selected from hydrogen and $C_1$–$C_4$ alkyl;
   c) an amine at a concentration of at least 0.8 wt % and not more than 3.4 wt %; and
   d) an inorganic alkali metal base at a concentration of at least 10 wt % and not more than 30 wt %;
wherein the alkoxylated aromatic alcohol component is present in an amount from 4–15 wt%. the poH of the composition is in the range of about 11 to about 14, and the ratio of the alkoxylated aromatic alcohol component to the base component is less than 1:1.

15. The coating removal composition of claim 14 wherein the inorganic base is selected from the group consisting of alkali metal silicates, alkali metal hydroxides, and mixtures thereof.

16. The coating removal composition of claim 14 wherein the amine is an alkanolamine.

17. The coating removal composition of claim 14 wherein the concentration of the amine component is at least 1.0 wt % and is not more than 3.2 wt %.

* * * * *

UNITED STATES PATENT AND TRADEMARK OFFICE
CERTIFICATE OF CORRECTION

PATENT NO. : 7,179,775 B2 Page 1 of 1
APPLICATION NO. : 10/660030
DATED : February 20, 2007
INVENTOR(S) : Foster It is certified that error appears in the above-identified patent and that said Letters Patent is hereby corrected as shown below:

Column 10, line 65, after the structure, add --wherein $R^1$, $R^2$, $R^3$, and $R^4$ are independently selected from hydrogen and methyl; $R^5$ is hydrogen, a $C_1$-$C_6$ alkyl or phenyl; and $R^6$ and $R^7$ are independently selected from hydrogen and $C_1$-$C_4$ alkyl.--

Column 11
Line 18, delete "an".
Line 19, delete "optionally" and insert therefor --optional--.
Line 20, delete "an".
Line 21, delete ",".
Line 21, delete "optionally" and insert therefor --optional--.

Column 12
Line 22, delete "wt%." and insert therefor --wt%,--.
Line 22, delete "poH" and insert therefor --pH--.

Signed and Sealed this

First Day of May, 2007

JON W. DUDAS
*Director of the United States Patent and Trademark Office*